United States Patent

[11] 3,603,000

[72] Inventor Seymour A. Ostrager
 Bronx, N.Y.
[21] Appl. No. 883,893
[22] Filed Dec. 10, 1969
[45] Patented Sept. 7, 1971
[73] Assignee Miracle Instrument Co.
 New York, N.Y.
 Continuation of application Ser. No.
 670,944, Sept. 27, 1967.

[54] SPIRIT LEVEL FRAME FOR MOUNTING SPIRIT VIAL UNITS
 12 Claims, 7 Drawing Figs.

[52] U.S. Cl. .................................... 33/211,
 33/207
[51] Int. Cl. ...................................... G01c 9/24
[50] Field of Search .......................... 33/207,
 211-214

[56] References Cited
 UNITED STATES PATENTS

| | | | | |
|---|---|---|---|---|
| 1,784,550 | 12/1930 | Sinner | | 33/207 |
| 2,633,640 | 4/1953 | Bucsko | | 33/211 |
| 2,727,314 | 12/1955 | Dossie | | 33/211 |
| 2,750,677 | 6/1956 | Wirth | | 33/211 |
| 2,906,031 | 9/1959 | Rice | | 33/207 |
| 2,961,774 | 11/1960 | Dreier | | 33/211 |
| 3,146,529 | 9/1964 | Chamberlin | | 33/207 |
| 3,159,924 | 12/1964 | Lieblein | | 33/207 |

Primary Examiner—Leonard Forman
Assistant Examiner—Dennis A. Dearing
Attorney—Caesar, Rivise, Bernstein & Cohen ABSTRACT: A spirit level frame having means for mounting therein a plurality of spirit vial units is provided in the form of an elongated frame of channelled construction having parallel sidewalls, a perpendicularly disposed connecting web between the parallel sidewalls so that the sidewalls project a substantial distance from one surface of the connecting web, and a thin walled projecting member extending from the outer surface of the connecting web to provide at least one right angle corner between said thin walled projecting member and said surface of the web. The projecting member, the outer surface of the connecting web and the parallel sidewalls provide versatile bearing surfaces for selectively engaging horizontal and vertical bodies in gauging the level and/or plumb thereof. The channelled construction of the spirit level frame permits spirit vial units to be adjustably and protectively arranged therein at longitudinally spaced intervals, including spirit vial units which permit simultaneous reading in two directions.

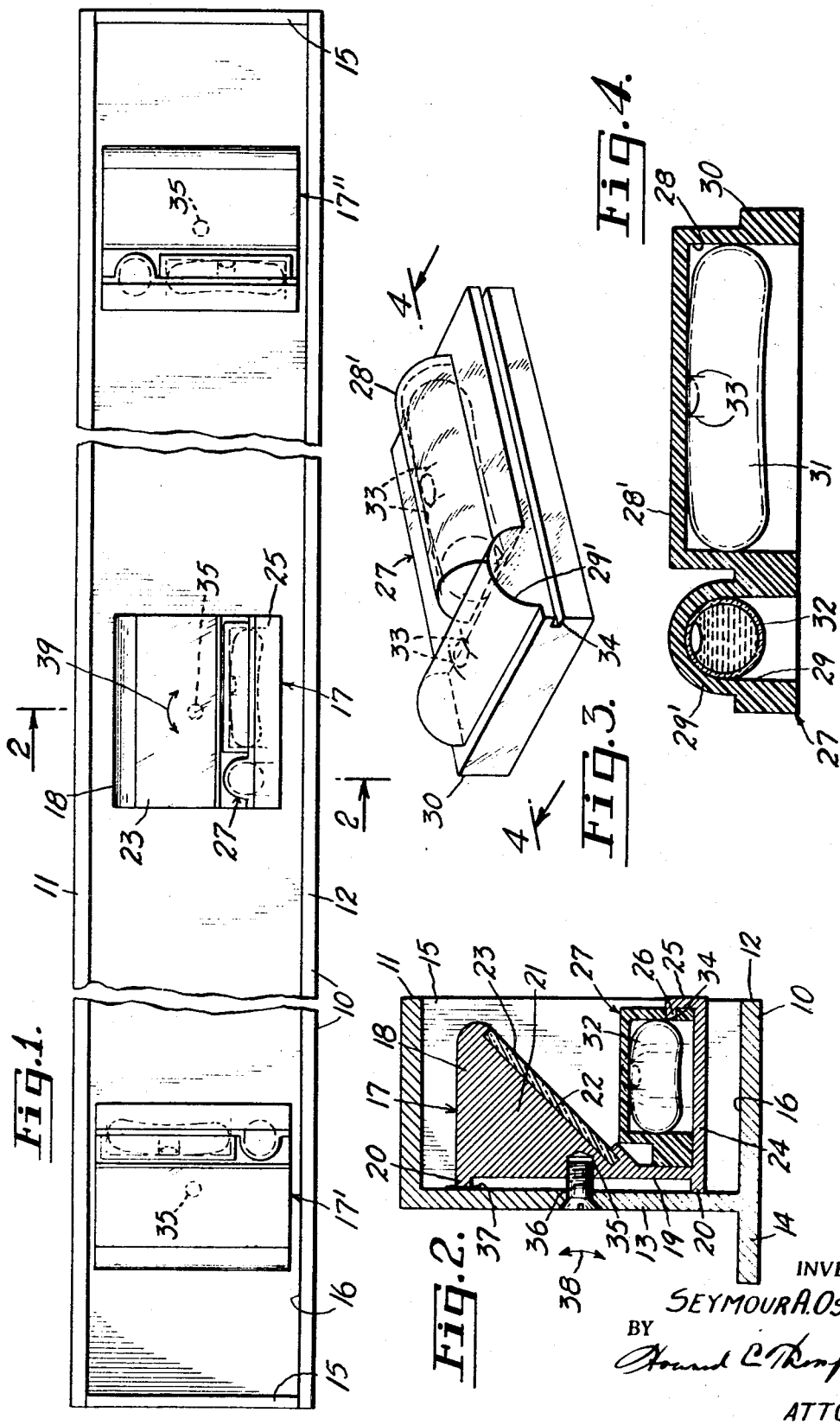

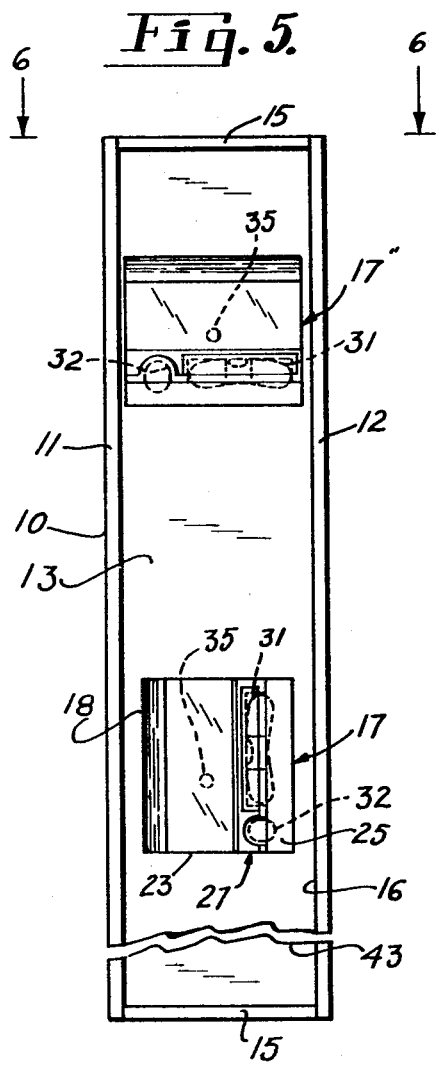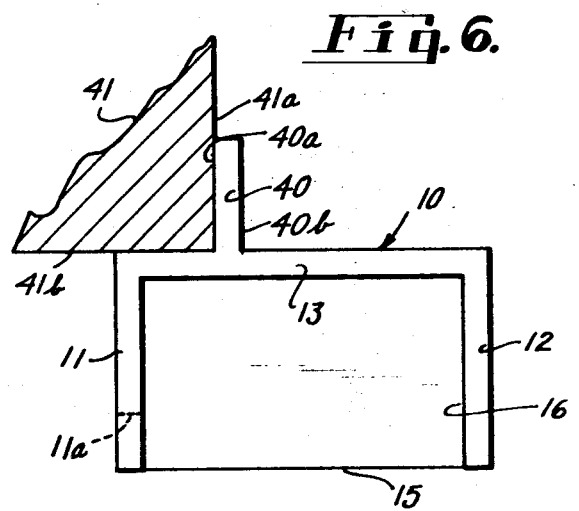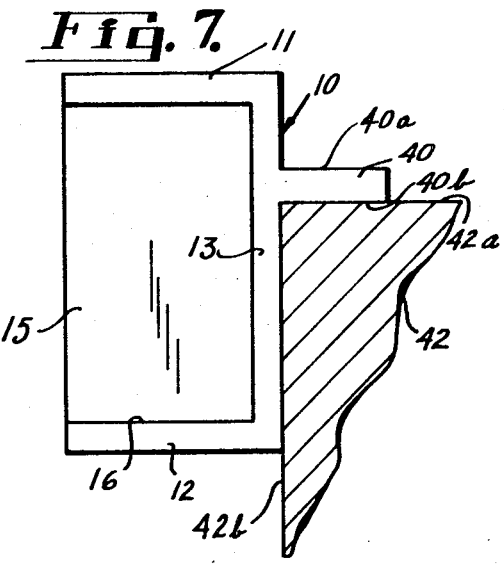

SPIRIT LEVEL FRAME FOR MOUNTING SPIRIT VIAL UNITS

This is a continuation application of copending application Ser. No. 670,944, filed Sept. 27, 1967.

The invention relates to a spirit level frame of channelled structure having means for simultaneously engaging perpendicularly disposed vertical, or vertical and horizontal surfaces, and providing means for protectively and adjustably supporting within the channel of said frame a plurality of spirit vial units including dual spirit vial units which permit simultaneous level and/or plumb readings in two directions.

The channelled structure of the level frame comprises parallel sidewalls extending in one direction from a perpendicularly disposed connecting web, and the means for simultaneously engaging perpendicularly disposed surfaces comprises a thin walled rib or flange extending perpendicularly from the opposed side of said web in alignment with one of said first named flanges or at a point intermediate said first named flanges. Alignment of the second named flange with one of the first named flanges has the advantage of providing an enlarged bearing surface at one side of the frame, while forming, between the second named flanged and the rear of said connecting web, a single right angle corner for simultaneously engaging perpendicularly disposed surfaces. Arrangement of the second named flange intermediate the first named flanges has the advantage of providing between the second named flange and the rear of said web two right-angle corners for selectively engaging different perpendicularly disposed surfaces.

Applicant is aware of Letters Patent granted to Dossie et al. U.S. Pat. No. 2,727,314, Dec. 20, 1955, and the references cited against this patent. The structure herein disclosed distinguishes clearly from the teachings in the patents in question in the provision of a level frame of such simple channelled construction that it can be produced by extrusion, and in providing for adjustable mounting of prefabricated and assembled vial units in the channel of the frame facilitating the proper setting of each of the units in the frame.

By virtue of employing prefabricated and assembled spirit vial units such as the type herein disclosed and adjustably mounting the same in the channeled spirit level frame, a highly efficient and accurate instrument is produced at a very economical cost.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a side view of a spirit level made according to my invention, with parts of the construction broken away;

FIG. 2 is an enlarged section on the broken line 2—2 of FIG. 1, with parts of the construction shown in elevation;

FIG. 3 is an enlarged perspective view of a spirit assemblage detached;

FIG. 4 is a section on the line 4—4 of FIG. 3;

FIG. 5 is a side view of another embodiment of the spirit level of my invention;

FIG. 6 is an enlarged view taken in the direction of the arrows 6—6 of FIG. 5; showing the level frame in engagement with perpendicularly disposed vertical surfaces and, FIG. 7 is a view similar to FIG. 6 showing the level frame in engagement with perpendicularly disposed horizontal and vertical surfaces.

In illustrating one adaptation and use of the invention, FIGS. 1 and 2 illustrate a frame 10 of the level, this frame being preferably formed of extruded material and of one piece construction. In the drawing, metal is indicated by the sectioning employed and, from the standpoint of weight, aluminum or aluminum alloys can be employed. This frame is generally U-shaped in cross-sectional form and comprises parallel sidewalls 11 and 12 joined to each other by means of a thin connecting web or wall 13 disposed perpendicularly therebetween. The wall 12 includes a flange extension 14 which projects beyond the exposed surface of web or wall 13. The angular surface of the walls 13 and 14 are at right angles to each other to provide the simultaneous gauging of two perpendicularly disposed vertical surfaces or horizontal and vertical surfaces. When the frame 10 is extruded, the ends of the walls 11, 12 and 13 may be joined by end walls 15, as clearly illustrated in FIG. 1.

The walls 11, 12 and 13 form a channel 16 in the frame 10, in which are arranged a plurality of similar dual vision spirit vial units 17, 17', 17''. The description of one vial unit will apply to all. The vial units 17', 17'' are arranged transversely of the frame at end portions thereof; whereas the vial unit 17 is arranged longitudinally and positioned at the central portion of the frame 10. This construction provides end and central readings of the level in the use thereof.

Considering FIGS. 2, 3, and 4, the dual spirit unit 17 comprises a prefabricated assemblage consisting of a molded or extruded body 18 of any material, metal being shown by virtue of the sectioning employed. The body 18 has what might be termed a backwall 19, having at end portions projecting flanges 20. From the standpoint of reading the units, the top of the wall 19 has a forward triangular extension 21, with a socket 22 arranged at an angle of 45° to the wall 19 for support of a mirror 23, as clearly seen in FIG. 2.

The bottom of the body 18 has a wall 24 at right angles to the wall 19. The foreward end of 24 has a short raised wall 25 which may include an inwardly directed flange 26. This latter structure forms on the body 18 a channel for support of a spirit assemblage or spirit vial unit 17, shown detached in FIGS. 3 and 4 on an enlarged scale.

The assemblage 27 comprises a casing of molded transparent plastic material fashioned to form long and short chambers 28 and 29, having semicircular tops 28' and 29', the top 28' of one chamber being at right angles to the top 29' of the other chamber. The tops 28' and 29' project above the top of a rectangular base 30 of the casing. The chambers 28 and 29 open through the base 30, as seen in FIG. 4.

Mounted in the chambers 28 and 29 are long and short spirit vials 31, 32 having curved upper surfaces, note FIGS. 2 and 4, on which are the usual markings 33 for proper reading of the spirit vials. The spirit vials 31 and 32, when properly adjusted, are cemented in the chambers 28 and 29. The bottom and edges of the casing can be used to judge the settings of the spirits, as and when these surfaces are in proper angular relationship with respect to each other.

Considering FIGS. 2 and 3, one of the edges of the base 30 of the casing has a longitudinal groove 34 to receive the flange 26 in coupling the assemblage 27 with the body 18. The assemblage 27 can be cemented in position in the body 18 or a press fit could be provided in preventing displacement of the assemblage with respect to the body. The body 18 has a threaded bore 35 to receive a screw 36, note FIG. 2, in coupling each unit 17, 17', 17'' with the frame 10. Heads of the screws 36 are countersunk, as clearly shown.

It will be noted that all of the units are made of such size as to fit freely within the walls 11 and 12 of the frame, so as to provide adjustment of the units in the frame in originally gauging the setting of the spirits of these units, preparatory to sale of the level. In one adjustment, it may be found necessary to grind off one of the flanges 20 on the body 18, or to use a thin shim in connection with one of the flanges, as shown at 37 in FIG. 2 of the drawing. This cares for the adjustment in directions of the arrow 38 of FIG. 2. Other adjustments of the units are in the directions of the arrows 39, FIG. 1, which are accomplished by rotation on the screws 36. When both adjustments have been accurately made, the screws 36 are tightened to securely hold each of the units against movement in the frame 10.

In the use of the level, in gauging horizontal and vertical surfaces, or gauging the combination of horizontal and vertical surfaces, the viewing of the mirror of each spirit vial unit will show the proper reading of one of the spirit vials and, when both levels and plumbs are being simultaneously tested, here again, the one vision will show accurate positionings of both the spirit vials in the unit being viewed.

The versatility and flexibility in use of the spirit level frame of the invention is further illustrated in the embodiments shown in FIGS. 5–7. In the embodiment illustrated in FIG. 5, two spirit vial units 17, 17" are shown assembled in spirit level frame 10 so that one spirit vial unit 17 is disposed longitudinally of spirit level frame 10 while the other spirit vial unit 17" is disposed transversely of the frame 10.

FIGS. 6 and 7 show a flange extension 40 positioned intermediate sidewalls 11 and 12 and extending perpendicularly from the opposite surface of web 13. In FIG. 6 the spirit level frame 10 is shown in engagement with two perpendicularly disposed vertical surfaces 41a and 41b of an object 41 which might be visualized as the left side of a door frame. Surface 41a bears against surface 40a of the flange 40, and the plumb of surface 41a is gauged by spirit vial 31 in the vial unit 17". Surface 41b is engaged by the outer surface of web 13, and the plumb of surface 41b is gauged by the spirit vial 32. Similarly, the right side of the door frame can be engaged between the surface 40b of the flange 40 and the outer surface of the web 13 without the need for changing the orientation of the spirit level frame as would be the case with the structure shown in FIGS. 1 and 2. Thus for some uses of a spirit level the location of the flange 40 intermediate the flanges 11 and 12 can provide a more versatile instrument than the construction as shown in FIG 2 wherein the flange 14 is in alignment with one of the channel flanges.

In FIG. 7 the spirit level frame 10 is shown in engagement with perpendicularly disposed horizontal surface 42a and vertical surface 42b of an object 42 which can be visualized as the upper corner of a shelf, wall or the like. Surface 42a bears against surface 40b of the flange 40 and the level of surface 42a is gauged by spirit vial 31 in the vial unit 17. Surface 42b is engaged by the outer surface of the web 13, and the plumb of the surface 42b is gauged by spirit vial 32 in the vial unit 17. Similarly, the front and lower corner of a body exposing horizontal and vertical surfaces can be engaged between the surface 40a of flange 40 and the outer surface of the web 13 without the need for changing orientation of the spirit level frame.

The assemblage shown in FIG. 5 disregarding the line of break or foreshortening indicated at 43, can be considered as a complete instrument which is both compact and inexpensive since it includes only two spirit vial units. With such an instrument it is of course necessary that vial unit 17" be oriented in an upward position for making vertical or combined vertical readings as shown in FIG. 6; and the sidewall 12 must be oriented in a downward position for making all horizontal or combined horizontal and vertical readings as shown in FIG. 7. A more versatile but more expensive instrument would be provided by elongating the frame 10 for the mounting of 4 vial units therein with the vial units 17 and 17" repeated in reverse orientation below the break line 43. With such an instrument, it will be apparent that the instrument is ready for use in the manner shown in FIG. 6 in either vertical orientation of the instrument, and ready for use in the manner shown in FIG. 7 in either horizontal orientation of the instrument.

When flange extension 40 is provided intermediate sidewalls 11 and 12, its positioning therebetween is not critical; however, it is preferable to so position the flange 40 that the distance of the flange 40 from the closest sidewall 11 or 12 is at least about equal to the distance that flange 40 extends from the planar surface of the web 13.

It is also preferred that sidewalls 11 and 12 project equidistant from the other planar surface of web 13 so that they will be of the same height. However, this, too, is not critical and one sidewall can be shorter than the other as indicated at 11a in FIG. 6.

By virtue of the simple construction of the spirit level frame 10 of the invention and the use of prefabricated and assembled spirit vial unit, adjustably secured within the channel of said frame, an instrument of the type and kind disclosed herein can be economically produced and sold at reasonable prices, while giving to the public a highly practical and serviceable instrument.

Although the spirit vial units which can be employed with the spirit level frame of the invention have been described herein with some particularity, it is to be understood that this has been done primarily to enable clear visualization of the versatility of the new level frame in use, and not with the thought that the particular vial units disclosed are essential to the basic level frame structure.

The vial units 17, 17' and 17" are novel in themselves and are more fully disclosed and claimed in my pending application Ser. No. 670,943, filed Sept. 27, 1967. It will be apparent to those utilizing the novel spirit level frame, however, that other types of spirit vials and/or spirit vials units can be protectively and adjustably mounted within the channel of the level frame. This is evidenced by the fact that novel spirit vial units of totally different structure, but mounted in the same type of channelled level frame have been disclosed in my pending application Ser. No. 837,467, filed June 30, 1969.

Various changes and modifications in the spirit level frames and supporting means as herein disclosed will occur to those skilled in the art and to the extent that such changes and modifications are embraced by the appended claims it is to be understood that they constitute part of the present invention.

I claim:

1. A spirit level of elongated structure having spirit vial units at longitudinally spaced intervals thereof, said spirit level consisting essentially of a spirit level frame comprising an elongated channel of U-shaped cross section, said frame having parallel sidewalls and a thin connecting web extending perpendicularly between said sidewalls, said sidewalls projecting a substantial distance from one surface of said web thereby forming a deep recess adapted to receive spirit vial units, a plurality of spirit vial units which are spaced longitudinally along said web and all of which are mounted on the same side of said web within the channel of said frame, at least one of said spirit vial units having one spirit vial oriented perpendicularly to said sidewalls and another spirit vial disposed perpendicularly to said web, and means on said unit facilitating simultaneous viewing of both spirit vials from a position laterally of said frame, at least one of said spirit vial units having a spirit vial oriented longitudinally of and parallel to said sidewalls, a thin walled projecting member extending beyond the other surface of said web and providing with said surface of the web at least one right-angle corner, whereby adjacent surfaces of said web and projecting member are adapted for collective engagement with two perpendicularly disposed vertical surfaces and with adjacent perpendicularly disposed horizontal and vertical surfaces.

2. A spirit level frame as defined in claim 1 wherein said projecting member is in alignment with one of said sidewalls and forms in conjunction therewith an enlarged surface.

3. A spirit level as defined in claim 1 wherein said projecting member is intermediate said sidewalls and forms, with the adjacent surface of said web, two right-angle corners for collective engagement with perpendicularly disposed surfaces.

4. A spirit level as defined in claim 3 wherein said projecting member is positioned inwardly from one of said sidewalls a distance which is at least about equal to the distance said projecting member extends from the surface of said web.

5. A spirit level comprising an elongated frame of channelled contour defined by parallel sidewalls and a thin connecting web perpendicular to said sidewalls, said sidewalls projecting a substantial distance from one surface of said web, a thin walled projecting member extending beyond the other surface of said web providing at least one right-angle corner between said projecting portion and adjacent web surface, and at lease one self-contained dual spirit unit secured to said connecting web between said sidewalls, said spirit unit comprising a body part and a spirit vial part, the body part having back and bottom walls disposed at right angles to each other, the backwall having a triangular extension arranged over and spaced from said bottom wall, one surface of said extension facing said bottom wall being at an acute angle to said bottom wall, a mirror supported on said one surface, a forward portion of the bottom wall having a short raised wall forming, in combination with said back and bottom walls, an upwardly directed channel, said spirit vial part having a rectangular base fitting snugly in said channel, said vial part including means projecting at the upper surface of said base for visably supporting and positioning two spirit vials in a common plane parallel to said bottom wall in close proximity to and at right angles to each other, and said body part including means at the rear of said backwall, comprising rearwardly extending flanges along opposed edges of said backwall and a central threaded recess, for adjustably mounting said spirit unit on the web of said frame.

6. A spirit level as defined in claim 5 wherein a plurality of said spirit units are mounted at longitudinally spaced positions on the web of said frame, at least one of said spirit units being disposed with the plane of said spirit vials perpendicular to the planes of the sidewalls of said frame.

7. A spirit level as defined in claim 5 wherein a plurality of said spirit units are mounted at longitudinally spaced positions on the web of said frame, at least one of said spirit units being disposed with the plane of said spirit vials parallel to the sidewalls of said frame.

8. A spirit level as defined in claim 5 wherein a plurality of said spirit units are mounted at longitudinally spaced positions on the web of said frame, at least two of said spirit units being differently oriented with one such unit being disposed with the plane of said vials perpendicular to the planes of he sidewalls of said frame, and the other of said units being oriented to dispose the plane of said vials parallel to the sidewalls of said frame.

9. A spirit level as defined in claim 5 wherein said projecting member is in alignment with one of the sidewalls of said frame providing with said sidewall are enlarged outer bearing surface.

10. A spirit level as defined in claim 9, wherein at least three spirit units are secured to the web of said frame, one of said units being located centrally of said frame, with the plane of said vials parallel with the sidewalls of said frame and adapted for viewing when the spirit level is resting on said enlarged outer bearing surface of the frame, and two other units being located at end portions of said frame with the plane of the vials of each such unit being disposed perpendicularly to the planes of the sidewalls of said frame, and the mirror on each such unit extending toward the adjacent end of said frame.

11. A spirit level as defined in claim 5 wherein said projecting member is intermediate the sidewalls of said frame providing, with the outer surface of said web, two right-angle corners for selective engagement with perpendicularly disposed surfaces.

12. A spirit level as defined in claim 11 wherein four spirit units are secured to said frame, two of said units being located centrally of said frame with the planes of said vials parallel to said sidewalls of said frame, the vials of one such unit being adjacent to one sidewall and the vials of the other such unit being adjacent the opposed sidewall, and two other units being located at end portions of said frame with the plane of the vials of each such unit being disposed perpendicularly to the planes of the sidewalls of said frame, and the mirror on each such unit extending toward the adjacent end of said frame.

UNITED STATES PATENT OFFICE

CERTIFICATE OF CORRECTION

Patent No. 3,603,000          Dated September 7, 1971

Seymour A. Ostrager

It is certified that errors appear in the above-identified patent and that said Letters Patent are hereby corrected as shown below:

(1) Column 1, line 25 "flanged" should be --flange--.

(2) Column 2, line 33 "17" should be --27--.

(3) Column 2, line 44 "reading" should be --readings--.

(4) Column 2, line 47 "settings" should be --setting--.

(5) Claim 2, line 57 omit the word "frame".

(6) Claim 2, line 59 after the word "enlarged" insert --bearing--.

(7) Claim 8, line 35 "he" should be --the--.

(8) Claim 9, line 6 "are" should be --an--.

Signed and sealed this 15th day of February 1972.

(SEAL)
Attest:

EDWARD M.FLETCHER,JR.          ROBERT GOTTSCHALK
Attesting Officer              Commissioner of Patents